Jan. 8, 1929.　　　　　　　　　　　　　　　1,698,682
T. JOHNSON
FILLER AND GAUGE FOR HUMIDIFYING PANS
Filed Sept. 17, 1927　　　2 Sheets-Sheet 1
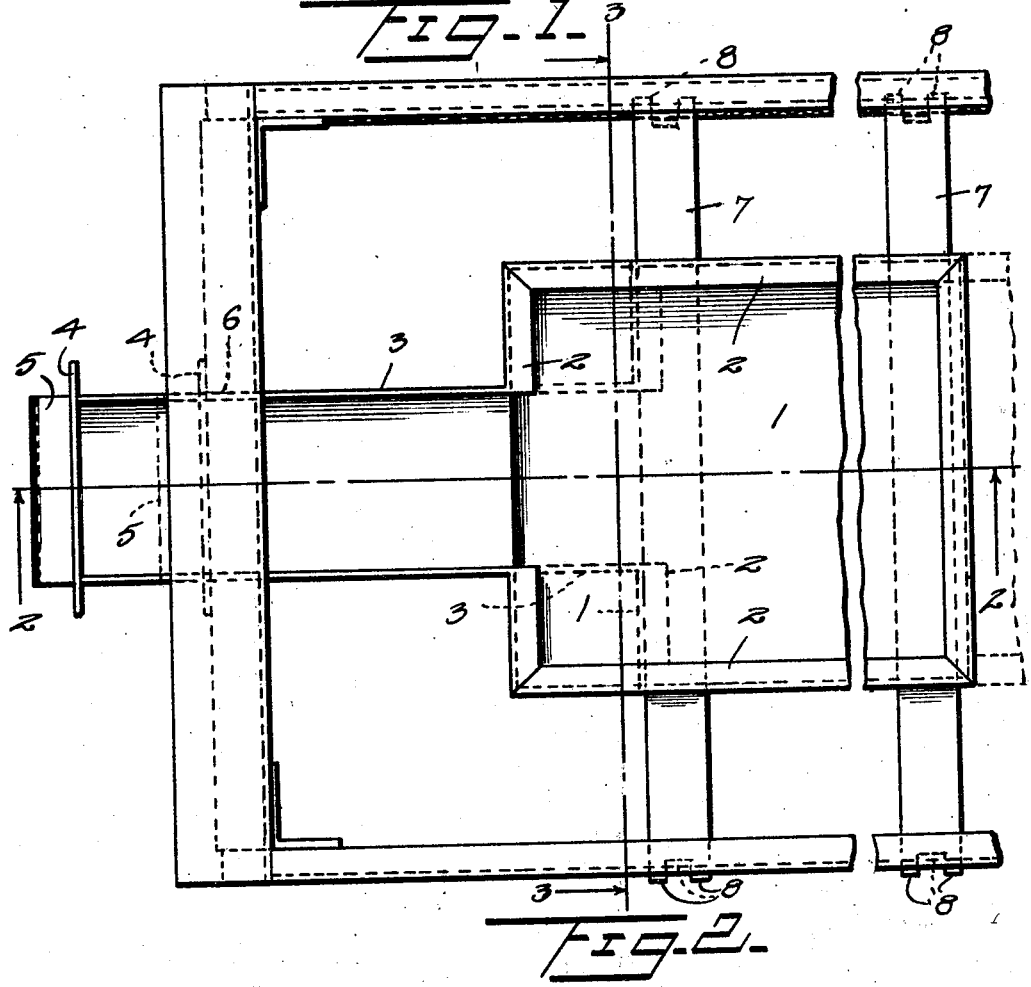
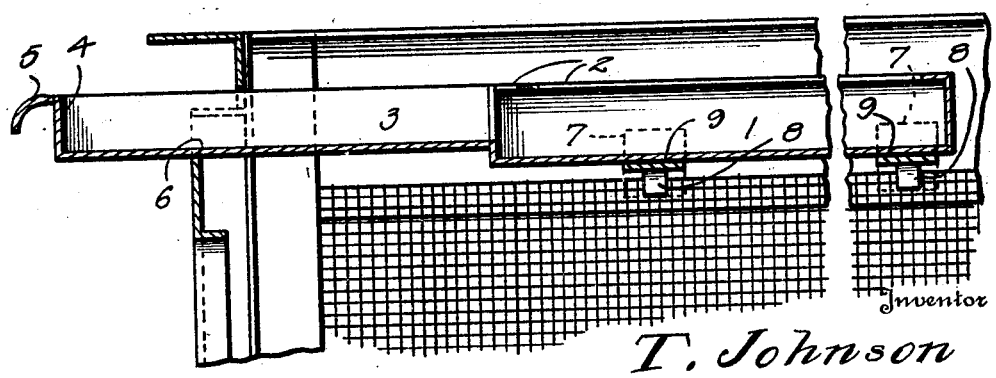
Inventor
T. Johnson
By Watson E. Coleman
Attorney Jan. 8, 1929. 1,698,682
T. JOHNSON
FILLER AND GAUGE FOR HUMIDIFYING PANS
Filed Sept. 17, 1927  2 Sheets-Sheet 2
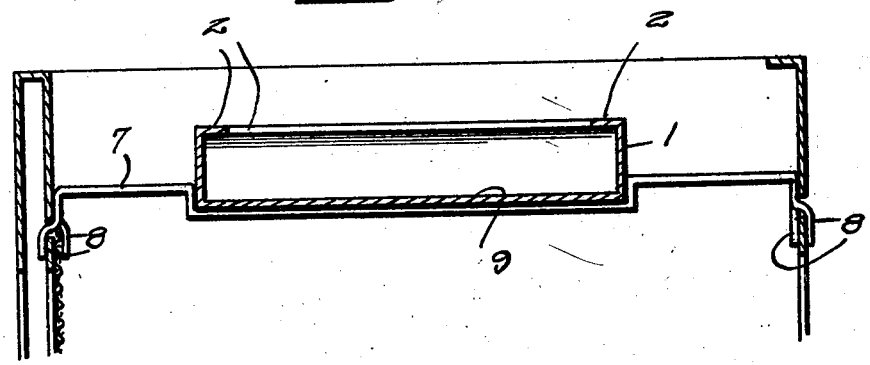
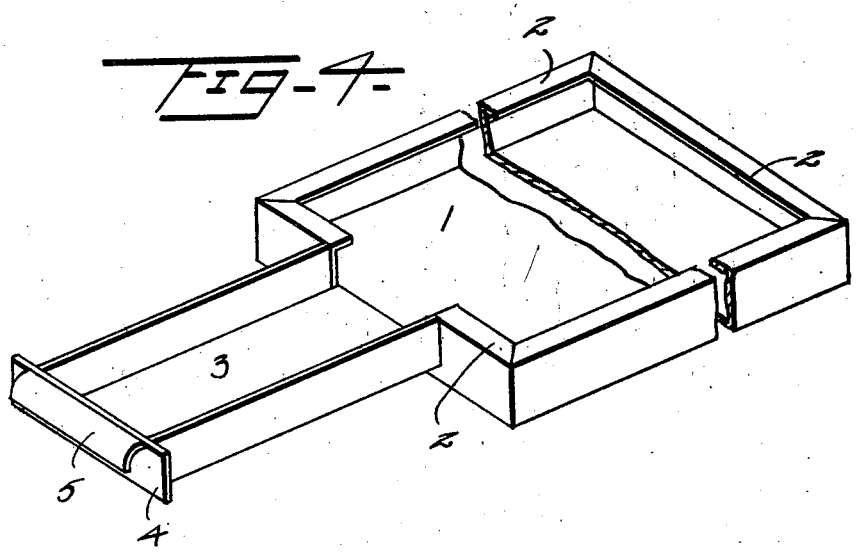
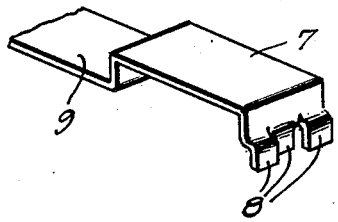
Inventor
T. Johnson
By Watson E. Coleman
Attorney Patented Jan. 8, 1929.

1,698,682

UNITED STATES PATENT OFFICE.

THEODORE JOHNSON, OF ERIE, PENNSYLVANIA, ASSIGNOR TO JOHNSON METAL PRODUCTS CO, OF ERIE, PENNSYLVANIA.

FILLER AND GAUGE FOR HUMIDIFYING PANS.

Application filed September 17, 1927. Serial No. 220,215.

This invention relates to a filler and gauge for a humidifying pan and it consists in the novel features hereinafter described and claimed.

An object of the invention is to provide a device of the character stated especially adapted to be used in conjunction with the cabinet of a radiator. The pan is used for holding a body of water and is provided at one end with an extension which is less in depth than the body of the pan and less in transverse breadth. The upper edges of the body and extension are flush and the extension is adapted to protrude through a side of the cabinet and is provided with a handle adapted to be used for moving the pan so that the extension may be disposed beyond the side of the cabinet and the pan may be refilled with water by pouring the same into the extension. Brackets are provided for supporting the pan in the cabinet so that it may slide therein. The pan with the neck extension is provided with a drawer stop and handle in one piece. To refill the pan, the drawer is pulled out and water is poured into the extension until it shows therein. The extension thus serves as a gauge. When the water is visible in the neck extension, it is evident that the water pan is supplied with a sufficient quantity of water. When the neck is dry, this indicates that the water in the pan has evaporated and should be replenished in order to provide the necessary moisture for the room.

In the drawings:—

Figure 1 is a top plan view of a cabinet with parts removed showing the filler pan applied;

Figure 2 is a longitudinal sectional view thereof;

Figure 3 is a transverse view thereof;

Figure 4 is a perspective view of the pan detached;

Figure 5 is a fragmentary perspective view of a guide member used in the structure.

The structure includes a pan body 1 of sheet metal having its upper edges turned in, forming flanges 2. A neck extension 3 is provided at one end of the pan body. The neck extension is formed from sheet metal and is less in depth than the depth of the pan body and less in transverse breadth. The upper edges of the pan body and the neck extension are flush with each other. The outer end of the neck extension 3 is closed by a plate 4 which forms a drawer stop and which is provided with a handle flange 5. The side of the cabinet is provided with a recess 6 which slidably receives the neck extension 3. Bracket members 7 are disposed transversely across the cabinet and secured to the sides thereof by means of hooks 8 formed at the ends of the said bracket members. The bracket members are provided at their intermediate portions with depressions 9 which receive the pan body 1.

It is apparent that by grasping the handle flange 5, the pan body and the extension thereof may be moved with relation to the cabinet, so that the neck extension 3 is brought to an extended position with relation to the top or cover of the cabinet. Thus, water may be poured into the outer portion of the extension and the said water will run through the neck extension into the body of the pan. When the level of the water becomes visible in the neck extension, this will indicate that the pan body has been supplied with a sufficient volume of the water. When the extension is pushed back under the cover, the drawer plate 4 comes in contact with the side of the cabinet and closes the recess 6. When the extension is moved out from under the cover of the cabinet and no water is seen upon the bottom of the extension, this is a signal that the pan should be resupplied with water.

I claim:—

1. In combination with a supporting frame having an opening in one side wall, brackets disposed transversely of the frame, the ends of the bracket extending horizontally on a level above the middle portion of the bracket and engaging the frame, a pan body less in width than the frame and slidably supported in the depressed middle portions of the brackets, said pan body having at one end a neck portion narrower than the body of the pan and less in depth than the pan and extending out through said opening.

2. A casing for radiators comprising a supporting frame, a casing having a front and a back, the front and back having apertures, pan supports extending from front to rear of the casing, each pan support being formed with angularly disposed lugs at its ends, certain of the lugs being forced outward and certain rearward, the outwardly projecting lugs being insertible through the perforations in the front and back of the casing and said lugs embracing the front and rear wall, the middle of each support being depressed, and a pan slidably mounted in the depressed portions of the supports.

In testimony whereof I hereunto affix my signature.

THEODORE JOHNSON.